(12) United States Patent
Hafenrichter et al.

(10) Patent No.: US 11,921,085 B2
(45) Date of Patent: *Mar. 5, 2024

(54) DYNAMIC LOCATION DATA CORRECTION USING NON-DESTRUCTIVE INSPECTION

(71) Applicant: The Boeing Company, Arlington, VA (US)

(72) Inventors: Joseph Lawrence Hafenrichter, Auburn, WA (US); Gary E. Georgeson, Tacoma, WA (US); James J. Troy, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,150

(22) Filed: Mar. 14, 2023

(65) Prior Publication Data
US 2023/0213481 A1 Jul. 6, 2023

Related U.S. Application Data

(63) Continuation of application No. 16/229,342, filed on Dec. 21, 2018, now Pat. No. 11,630,083.

(51) Int. Cl.
*G01N 29/04* (2006.01)
*B64F 5/60* (2017.01)
(Continued)

(52) U.S. Cl.
CPC ............. *G01N 29/043* (2013.01); *B64F 5/60* (2017.01); *G01M 5/0016* (2013.01);
(Continued)

(58) Field of Classification Search
CPC .... G01N 29/043; G01N 29/262; G01N 22/02; G01N 23/20; G01N 23/203;
(Continued)

(56) References Cited

U.S. PATENT DOCUMENTS 9,221,506 B1 * 12/2015 Georgeson ............... B05D 7/00
9,404,904 B2 * 8/2016 Puckett .................. G01N 27/90
(Continued)

FOREIGN PATENT DOCUMENTS

JP     H0354456 A    3/1991
JP     H03221862 A   9/1991
(Continued)

OTHER PUBLICATIONS

Japanese office action; Application 2019-220918; dated Nov. 14, 2023.

*Primary Examiner* — Jacques M Saint Surin
(74) *Attorney, Agent, or Firm* — Duft & Bornsen, PC

(57) ABSTRACT

Embodiments described herein utilize Non-Destructive Inspection (NDI) scan data obtained during a process performed on a surface of a structure to update a location of an NDI scanner on the surface. A subsurface feature within the structure is detected based on the NDI scan data, which are correlated with pre-defined position data for the subsurface feature. A measured location of the NDI scanner on the surface is corrected based on the pre-defined position data for the subsurface feature.

20 Claims, 9 Drawing Sheets

(51) Int. Cl.
*G01M 5/00* (2006.01)
*G01N 29/26* (2006.01)

(52) U.S. Cl.
CPC ........ *G01M 5/0033* (2013.01); *G01M 5/0075* (2013.01); *G01N 29/262* (2013.01); *G01N 2291/0289* (2013.01); *G01N 2291/263* (2013.01); *G01N 2291/2694* (2013.01)

(58) Field of Classification Search
CPC .. G01N 27/902; G01N 29/225; G01N 29/265; G01N 21/9515; G01N 23/00; G01N 23/04; G01N 2021/9518; G01N 2291/0289; G01N 2291/263; G01N 2291/2694; B64F 5/60; G01M 5/0016; G01M 5/0033; G01M 5/0075
USPC .......................................................... 702/39
See application file for complete search history.

(56) References Cited

U.S. PATENT DOCUMENTS

| | | | |
|---|---|---|---|
| 9,641,569 B2* | 5/2017 | Domke | H04L 65/403 |
| 10,788,428 B2* | 9/2020 | Troy | B64D 47/08 |
| 10,788,462 B2* | 9/2020 | Troy | G01N 25/72 |
| 11,630,083 B2* | 4/2023 | Hafenrichter | G01N 27/902 702/39 |
| 2014/0207862 A1* | 7/2014 | Domke | G06Q 10/06 709/204 |
| 2015/0122055 A1* | 5/2015 | Puckett | G01N 27/90 73/865.8 |
| 2016/0202689 A1 | 7/2016 | Szarski et al. | |

FOREIGN PATENT DOCUMENTS

| | | |
|---|---|---|
| JP | 2007263586 A | 8/2010 |
| JP | 2009204327 A | 12/2012 |

* cited by examiner

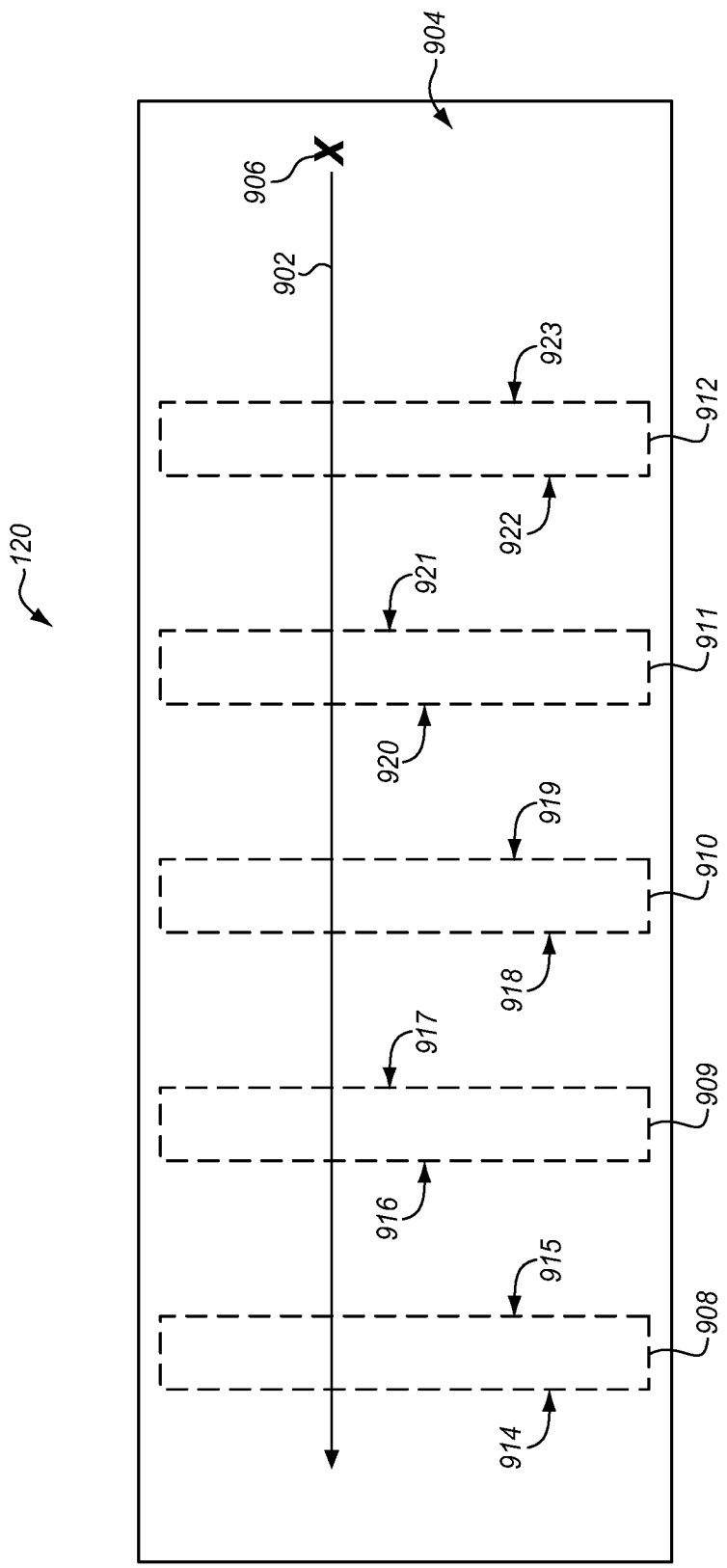

DYNAMIC LOCATION DATA CORRECTION USING NON-DESTRUCTIVE INSPECTION

RELATED APPLICATIONS

This non-provisional patent application is a continuation of U.S. patent application Ser. No. 16/229,342 filed on Dec. 21, 2018, which is incorporated herein by reference.

FIELD

This disclosure relates to the field of non-destructive inspection (NDI) and, in particular, to NDI processes that are performed on structures.

BACKGROUND

Building an aircraft may include attaching components to a support structure that provides structural rigidity. For example, the support structure may include hoop-wise frames and longitudinal elongated stringers, to which skin panels are attached. Together, the combination of skin panels and support structure defines a portion of the airframe of the aircraft.

Aircraft structures may be inspected at different times to determine whether the aircraft structures achieve a design criterion and/or are free from damage. For example, an aircraft structure may be inspected during manufacturing to ensure that the aircraft structure has been fabricated to specification. In another example, the aircraft structure may be inspected during service of the aircraft to ensure that the structure has not been damaged during operation of the aircraft.

Such inspections may be performed to determine whether subsurface anomalies are present within the aircraft structure. While subsurface anomalies may not be observable on an outside surface of the aircraft structure, various inspection processes can be performed that may reveal the presence of such subsurface anomalies. One type of inspection that may be performed is a Non-Destructive Inspection (NDI) test. NDI may also be referred to as Non-Destructive Evaluation or Examination (NDE) or Non-Destructive Testing (NDT). The techniques used to perform NDI testing vary widely, although NDI testing in general share a common trait that they do not permanently change the structure under inspection.

The inspection of aircraft structures may be performed by human operators using handheld devices, and/or by robotic assets. However, the NDI data generated during these processes requires measuring an accurate location of the NDI scanner in order to allow for the locations of the anomalies to be determined accurately, but acquiring accurate location data for NDI applications can be challenging.

Therefore, there is a need to improve upon the positioning aspects of NDI anomaly detection processes.

SUMMARY

Embodiments described herein utilize Non-Destructive Inspection (NDI) scan data to update a location of an NDI scanner on a surface of a structure. A subsurface feature within the structure is detected based on the NDI scan data, which is correlated with pre-defined position data for the subsurface feature. A measured location of the NDI scanner on the surface is corrected based on the pre-defined position data for the subsurface feature.

One embodiment comprises an apparatus that includes an NDI scanner and a controller. The NDI scanner generates NDI scan data during a process performed on a surface of a structure. The controller detects a subsurface feature within the structure based on the NDI scan data, accesses pre-defined position data for the subsurface feature, and corrects a measured location of the NDI scanner on the surface of the structure based on the pre-defined position data for the subsurface feature.

Another embodiment comprises a method of correcting a measured location of an NDI scanner during a process performed on a surface of a structure. The method comprises detecting a subsurface feature within a structure based on NDI scan data generated by an NDI scanner, accessing pre-defined position data for the subsurface feature, and corrects a measured location of the NDI scanner on the surface of the structure based on the pre-defined position data for the subsurface feature.

Another embodiment comprises an inspection vehicle. The inspection vehicle includes an NDI scanner that generates NDI scan data during a process performed on a surface of a structure. The inspection vehicle further includes a movement system that moves the inspection vehicle on a surface of the structure, and a position detector that measures a location of the inspection vehicle on the surface relative to a known location on the surface of the structure. The inspection vehicle further includes a controller. The controller directs the movement system to move the inspection vehicle on the surface along a pre-defined path, activates the NDI scanner to generate the NDI scan data, and detects a subsurface feature within the structure based on transitions in the NDI scan data. The controller accesses pre-defined position data for boundaries of the subsurface feature, and corrects the measured location based on the pre-defined position data for the subsurface feature and the known location.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

FIG. 9 illustrates a view of a wing of the aircraft of FIG. 1 in an illustrative embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
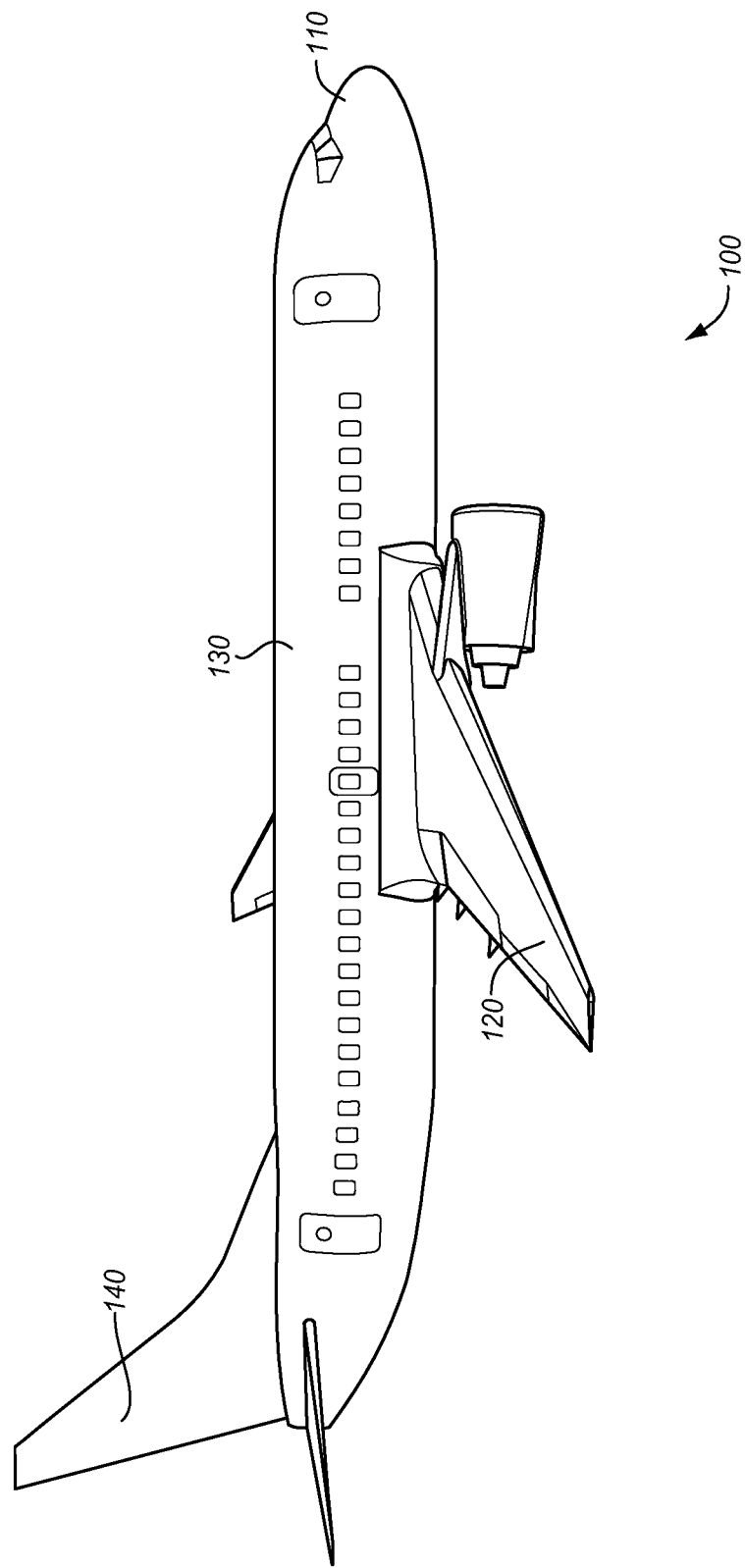
FIG. 1 depicts a side view of an aircraft in an illustrative embodiment.

FIG. 1 depicts a side view of an aircraft 100 in an illustrative embodiment. Aircraft 100 includes nose 110, wings 120, fuselage 130, and tail 140. Although aircraft 100 has been depicted to have a particular configuration for purposes of discussion, aircraft 100 may have other configurations in other embodiments. Aircraft 100 may go through a manufacturing process, a certification process, and a delivery process prior to being placed in service by a customer. Once aircraft 100 is placed into service, aircraft 100 may be scheduled for routine maintenance and service.

The illustrative embodiments described herein enable NDI crawlers, NDI robots, and NDI automated scanners self-correcting positioning capabilities by correlating pre-defined location data about subsurface features in the structure with NDI data collected during an inspection. The use of self-correcting NDI scanning systems improves the accuracy of the NDI process while expediting the NDI processes. The accuracy of the NDI process is improved by reducing location errors during the NDI scan, while the use of automated scanning systems expedites the NDI process.

Typical automated NDI scanning systems utilize location systems to position and orient an NDI scanner relative to a structure under inspection. However, location systems are subject to measurement errors which can be reflected in the accuracy of locating anomalies detected by the NDI process. Further, NDI crawlers may utilize localized location systems that provide an estimated position of their location on the surface of the structure, which is also subject to measurement errors. Deviations in a location of an NDI crawler on the surface of a structure under inspection can shift the measured locations of any anomalies detecting during the NDI process, which makes a precise localization of the anomalies difficult. While external location systems may be used to measure a position of NDI scanning devices, the setup and execution of external location guides (e.g., optical fiducials) requires an operator to set up and position the external location guides correctly. Further, such set up and positioning of the external location guides adds additional time to the NDI process.

In the illustrative embodiments described herein, NDI scan data generated by an NDI scanner during a process performed on a surface of a structure is analyzed to detect a subsurface feature within a structure, and pre-defined position data for the subsurface feature is accessed. A measured location of the NDI scanner on a surface of the structure is corrected based on the pre-defined position data for the subsurface feature.

The illustrative embodiments described herein may be employed during the manufacturing process, and/or the certification process, and/or the delivery process, and/or after being placed in service by the customer. In particular, the illustrative embodiments described herein may be utilized to improve the manufacturing process for aircraft 100 by expediting the assembly and/or the inspection of aircraft 100, while reducing the costs associated with manufacturing aircraft 100. Further, the illustrative embodiments described herein may be utilized to expedite the routine maintenance or service process for aircraft 100, thereby reducing the costs associated with inspecting aircraft 100.

Figure 2:
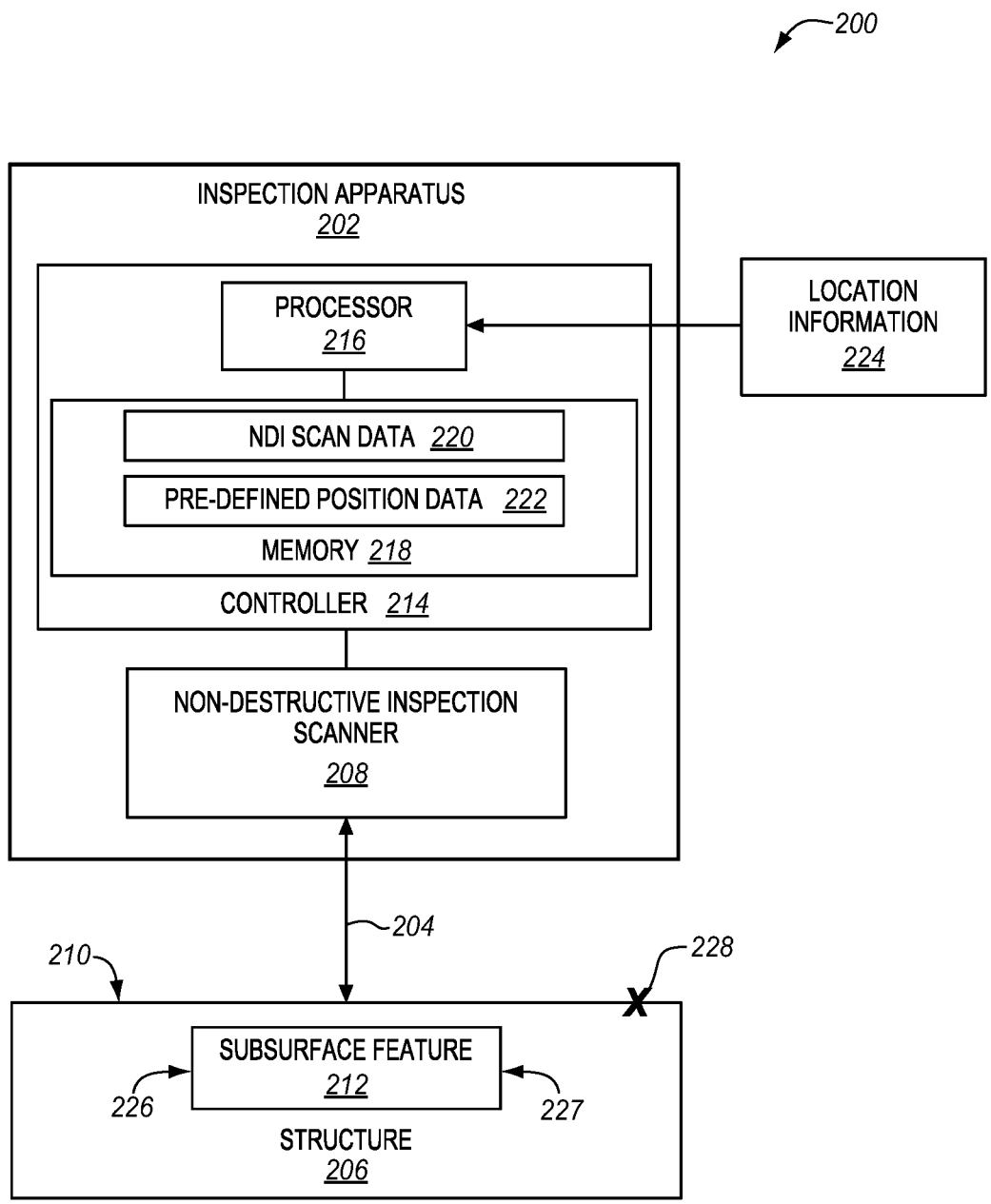
FIG. 2 is a block diagram of an inspection environment in an illustrative embodiment.

FIG. 2 illustrates an inspection environment 200 in an illustrative embodiment. Inspection environment 200 may be used to inspect aircraft 100 of FIG. 1. In this embodiment, inspection environment 200 includes an inspection apparatus 202 which may be used to perform an inspection 204 of a structure 206. Structure 206 may include any type of fabricated structure, including aircraft structures (e.g., nose 110 of aircraft 100, wing 120 of aircraft 100, fuselage 130 of aircraft 100, and tail 140 of aircraft 100). In this embodiment, inspection 204 is performed using an NDI scanner 208 of inspection apparatus 202. For example, NDI scanner 208 may be placed proximate to a surface 210 of structure 206 during an anomaly detection process. In the illustrative embodiments described herein, NDI scanner 208 is capable of detecting a subsurface feature 212. Subsurface feature 212 may include any type of fabricated part, such as ribs underneath skin panels that form wing 120, stringers underneath skin panels that form fuselage 130, or the feature may be a change in the surface structure, such as a change in thickness, density, porosity, holes, cutouts, etc.

In this embodiment, inspection apparatus 202 further includes a controller 214, which coordinates the activities of inspection apparatus 202. While the specific hardware implementation of controller 214 is subject to design choices, one particular embodiment may include one or more processors 216 coupled with a memory 218. Processor 216 includes any hardware device that is able to perform functions. Processor 216 may include one or more Central Processing Units (CPU), microprocessors, Digital Signal Processors (DSPs), Application-specific Integrated Circuits (ASICs), etc. Some examples of processors include INTEL® CORE™ processors, Advanced Reduced Instruction Set Computing (RISC) Machines (ARM®) processors, etc. Memory 218 includes any hardware device that is able to store data. For instance, memory 218 may store NDI scan data 220, which is generated by NDI scanner 208 during inspection 204 of structure 206. Memory 218 may also store pre-defined position data 222 regarding subsurface feature 212 of structure 206. Memory 218 may include one or more volatile or non-volatile Dynamic Random-Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM. Although processor 216 is illustrated as being part of inspection apparatus 202, in other embodiments processor 216 may be separate or outside of inspection apparatus 202 and connected to inspection apparatus with a cable or connected through a wireless communication link.

During operation, inspection apparatus 202 utilizes location information 224 during inspection 204. Location information 224 comprises a measured location of NDI scanner 208 on surface 210 of structure 206 relative to a reference location. Location information 224 may be generated, for example, using a location detector within inspection apparatus 202 (not shown) or by an external location system that measures a location of NDI scanner 208 on surface 210 of structure 206. Location information 224 may be sent to processor 216 continuously such that processor 216 has access to the most current and up to date location of inspection apparatus 202 on surface 210 of structure 206. In some embodiments, location information 224 may be sent to processor 216 periodically and/or in response to an event. Processor 216 may utilize location information 224 to correlate NDI scan data 220 generated by NDI scanner 208 with subsurface feature 212 (e.g., using pre-defined position data 222 of subsurface feature 212). Processor 216 may also utilize location information 224 to correlate NDI scan data 220 generated by NDI scanner 208 with anomalies or inconsistencies detected in structure 206.

Figure 3:
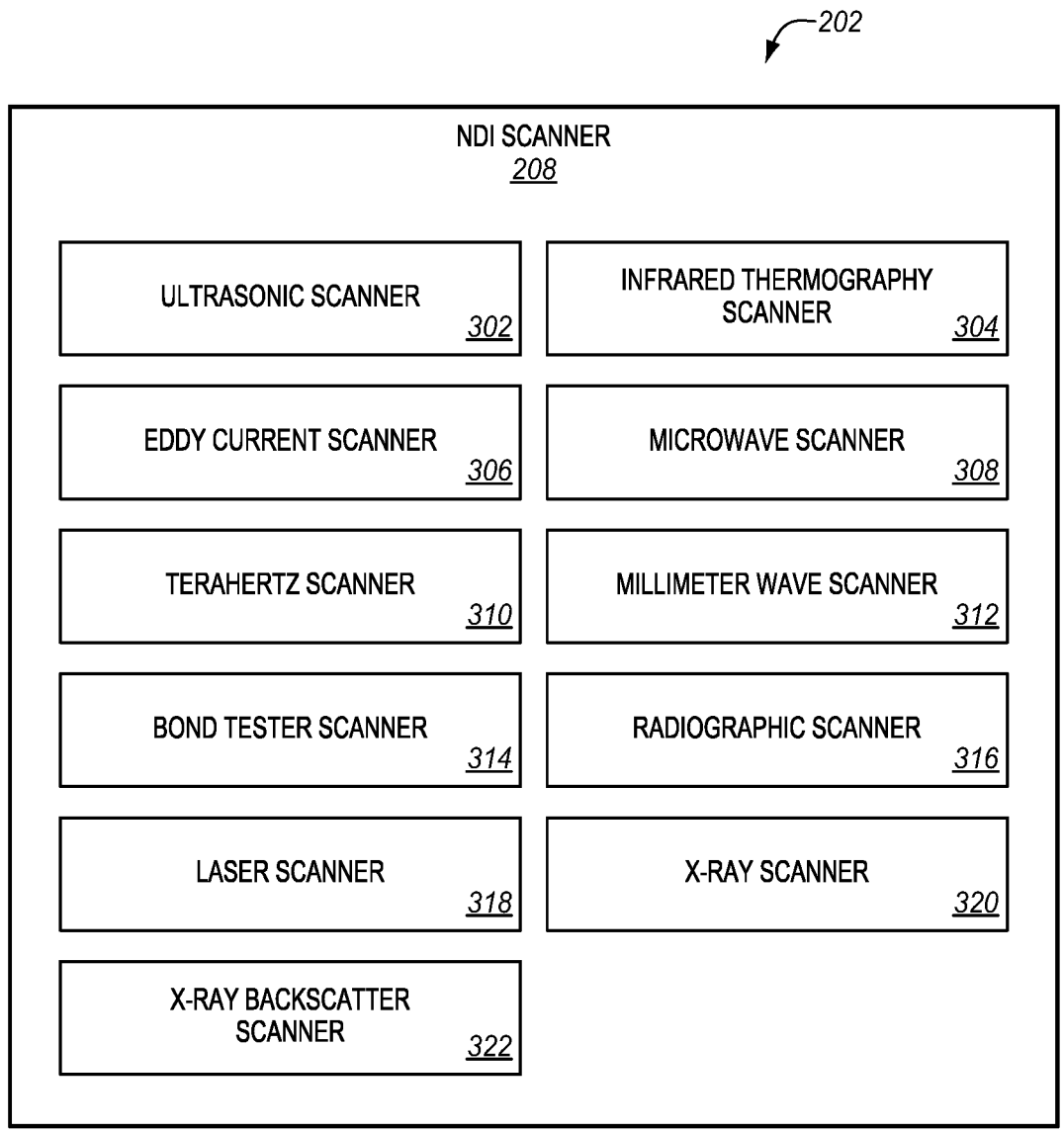
FIG. 3 is a block diagram providing additional details of an NDI scanner of FIG. 2 in an illustrative embodiment.

FIG. 3 illustrates additional details of NDI scanner 208 in an illustrative embodiment. In some embodiments, NDI scanner 208 may comprise an ultrasonic scanner 302, an infrared thermography scanner 304, an eddy current scanner 306, a microwave scanner 308, a terahertz scanner 310, a millimeter wave scanner 312, a bond tester scanner 314, a radiographic scanner 316, a laser scanner 318 (e.g., a laser thermography scanner), an x-ray scanner 320, a backscatter x-ray scanner 322, or combinations thereof. Inspection 204 may be performed on a surface 210 of structure 206, which may reveal information regarding subsurface feature 212 within structure 206 along with any anomalies or inconsistencies within structure 206.

Ultrasonic scanner 302 may include an array of transducers that send signals into structure 206 and detect responses to those signals during inspection 204 that reveal subsurface features of structure 206. Infrared thermography scanner 304 uses infrared images during inspection 204 of structure 206 to reveal subsurface features of structure 206. Eddy current scanner 306 may utilize an array of probes that generates a magnetic field during inspection 204 that induces eddy currents in structure 206 and detects changes in the eddy currents based on the subsurface features of structure 206. Microwave scanner 308 may transmit microwaves into structure 206 and detect responses to the microwaves during inspection 204 that reveal subsurface features of structure 206. Terahertz scanner 310 may utilize inspection signals in the range of 0.3 to 3 terahertz, while millimeter wave scanner 312 may utilize inspection signals in the range of 30 Gigahertz to 300 Gigahertz. Bond tester scanner 314 utilizes different modes of operation to inspect a wide range of materials and combinations of materials used in multi-layered bonded structures and modern composites. Radiographic scanner 316 utilizes x-rays or gamma rays as inspection signals, while laser scanner 318 (e.g., a laser thermography scanner) may utilize coherent light as inspection signals.

Figure 4:
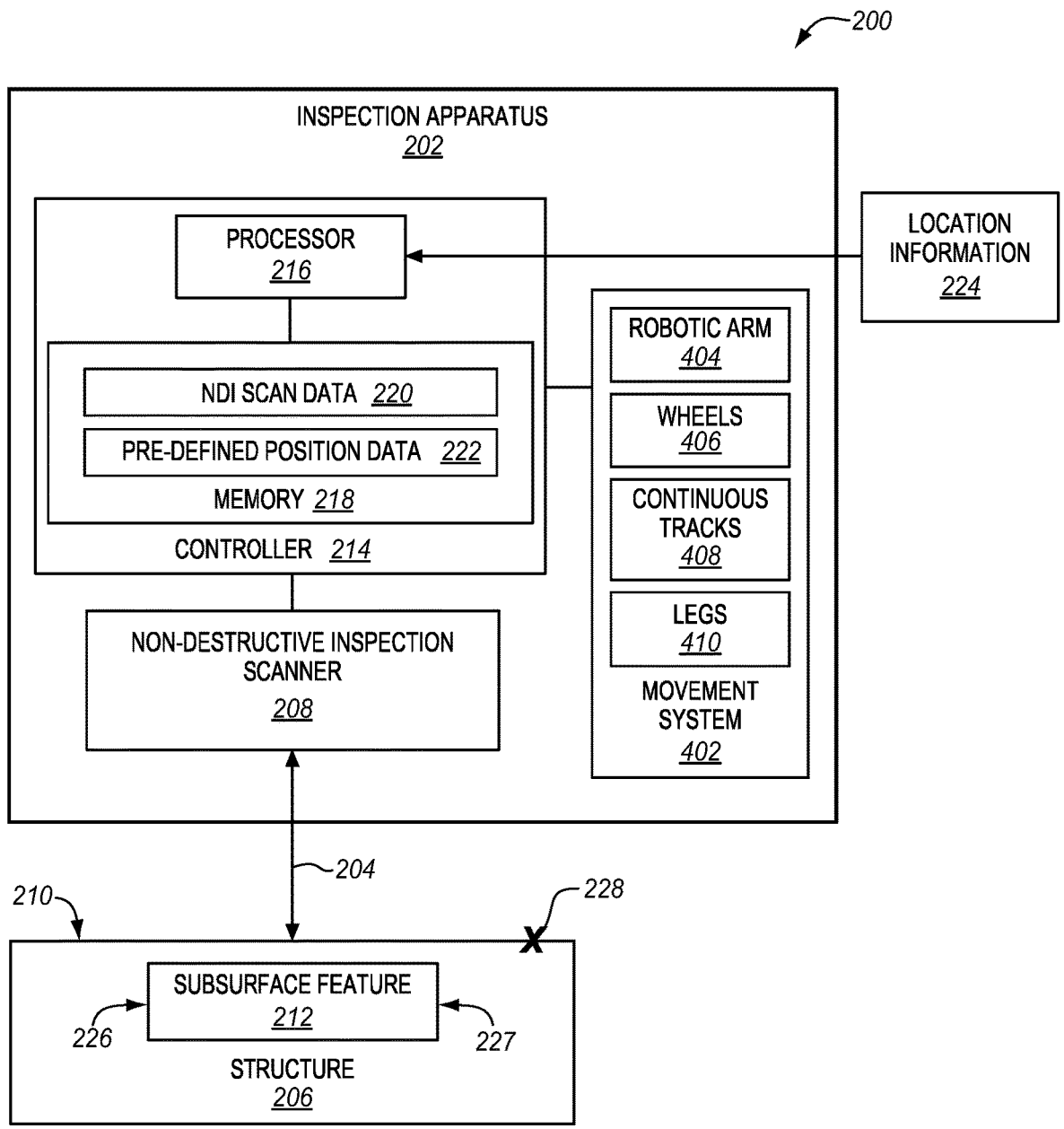
FIGS. 4-5 are block diagrams of the inspection apparatus of FIG. 2 in other illustrative embodiments.

FIG. 4 is a block diagram of inspection apparatus 202 in another illustrative embodiment. In this embodiment, inspection apparatus 202 further includes a movement system 402. Movement system 402 operates to move NDI scanner 208 on surface 210 of structure 206. For instance, during inspection 204, movement system 402 may move NDI scanner 208 along a pre-defined path across surface 210 of structure 206. For instance, processor 216 may utilize location information 224 during inspection 204 to guide NDI scanner 208 along the pre-defined path across surface 210 of structure 206. Movement system 402 may comprise a robotic arm 404 (e.g., with NDI scanner 208 attached thereto), wheels 406, continuous tracks 408, legs 410, or combinations thereof.

Figure 5:
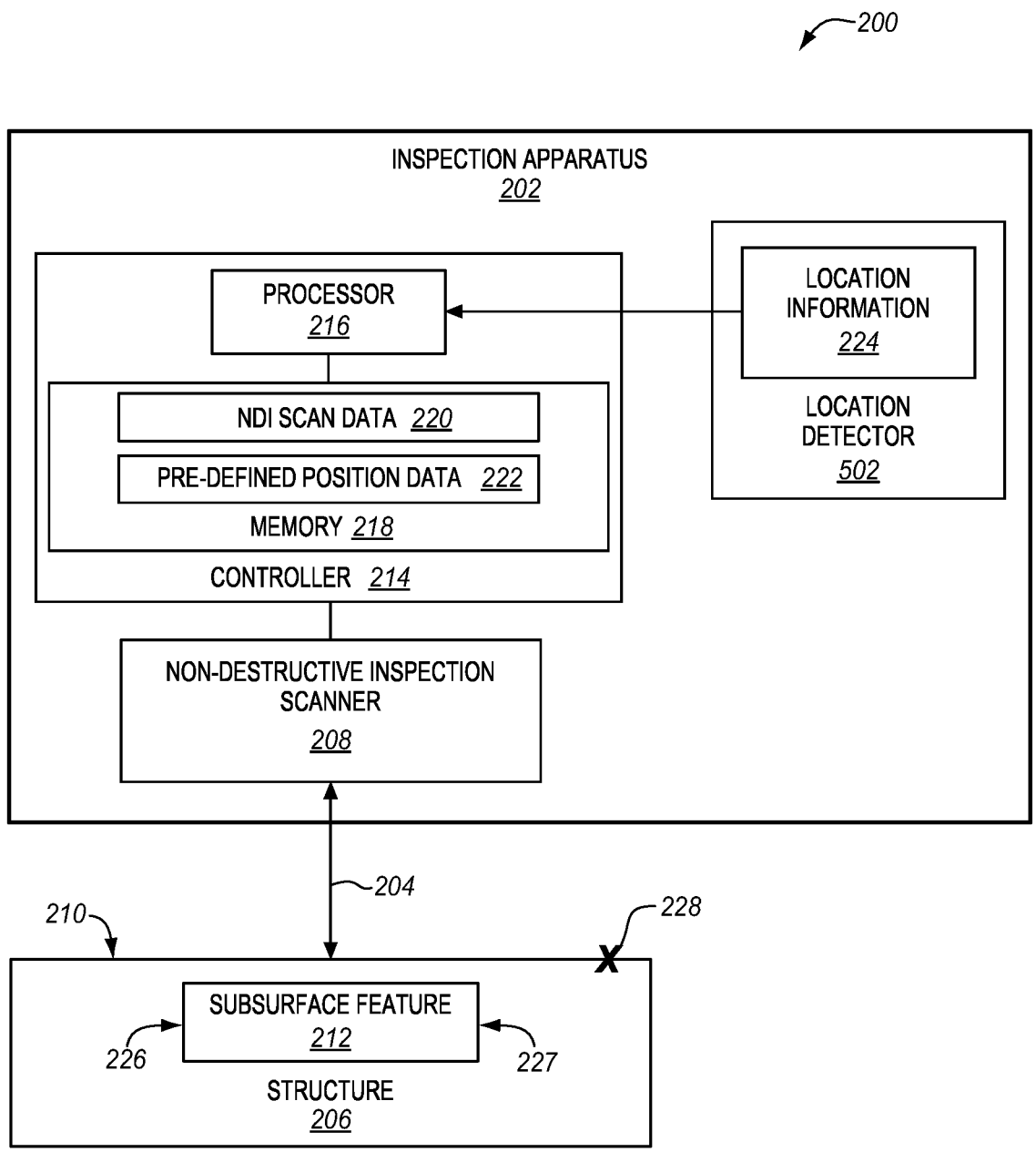

FIG. 5 is a block diagram of inspection apparatus 202 in another illustrative embodiment. In this embodiment, inspection apparatus 202 includes a location detector 502, which generates location information 224. Location detector 502 may comprise rotary encoders or other types of location detection systems that measure a displacement of inspection apparatus 202 relative to structure 206. For instance, location detector 502 may measure a displacement of NDI scanner 208 on surface 210 of structure 206 that is relative to a known location 228 (see FIG. 2) on surface 210 of structure 206.

Figure 6:
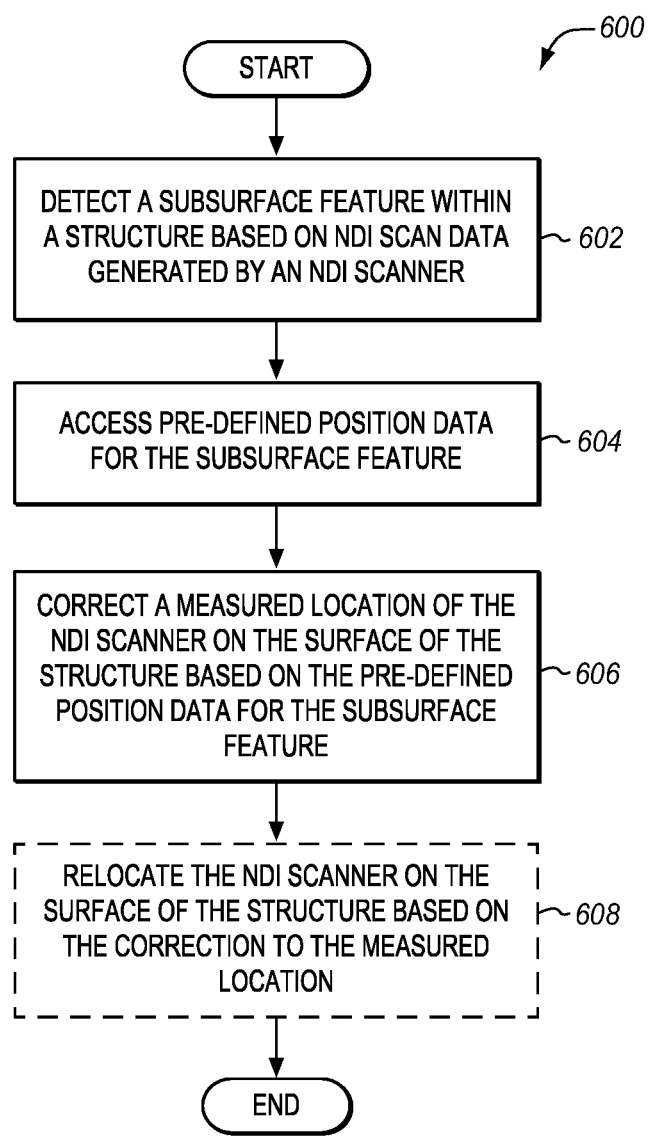
FIGS. 6-7 are flow charts of a method of correcting a measured location of an apparatus that includes an NDI scanner during an inspection of a structure.
Figure 7:
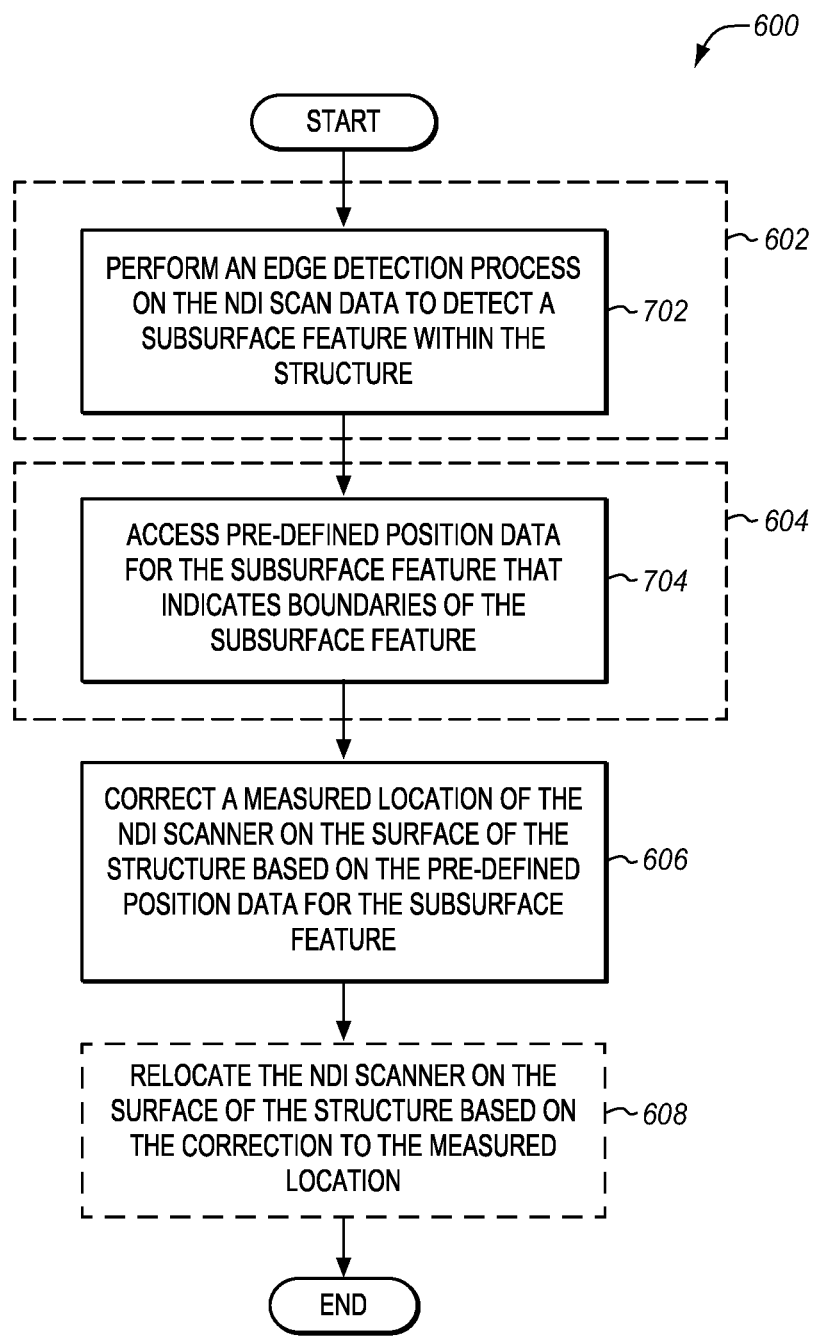

Consider that inspection apparatus 202 is on surface 210 of structure 206 and ready to perform inspection 204. FIGS. 6-7 are flow charts of a method 600 of correcting a measured location of an apparatus that includes an NDI scanner during an inspection of a structure. Method 600 will be described with respect to inspection environment 200, although method 600 may be performed by other inspection environments or systems, not shown. The steps illustrated for method 600 are not all inclusive, and method 600 may include other steps, not shown. Further, the steps of method 600 may be performed in an alternate order.

During inspection 204, NDI scanner 208 moves relative to structure 206 and generates NDI scan data 220. During the movement of NDI scanner 208 relative to structure 206, updates to location information 224 allow processor 216 to correlate the location of NDI scanner 208 with NDI scan data 220 generated by NDI scanner 208. For instance, NDI scanner 208 may be placed at known location 228 on surface 210 of structure 206, and inspection apparatus 202 is programmed to follow a pre-defined path across surface 210. Processor 216 uses the pre-defined path and location information 224 to direct movement system 402 to follow the pre-defined path.

Processor 216 detects a subsurface feature 212 within structure 206 based on NDI scan data 220 (see step 602). For example, processor 216 may perform an edge detection process on NDI scan data 220 to detect boundaries 226-227 of subsurface feature 212 within structure 206 (see step 704 of FIG. 7).

Processor 216 accesses pre-defined position data 222 for subsurface feature 212 (see step 604). For instance, pre-defined position data 222 may indicate boundaries 226-227 of subsurface feature 212 (see step 702 of FIG. 7). Processor 216 corrects a measured location of NDI scanner 208 on surface 210 of structure 206 based on pre-defined position data 222 for subsurface feature 212 (see step 606). For instance, as NDI scanner 208 moves along surface 210, a measurement error of the location of NDI scanner 208 may occur. Using pre-defined position data 222 regarding subsurface feature 212, processor 216 is able to correct location information 224. In some embodiments, processor 216 may direct movement system 402 to relocate NDI scanner 208 on surface 210 based on the correction to the measured location of NDI scanner 208 (see optional step 608). For example, if NDI scanner 208 is following a pre-defined path relative to structure 206, processor 216 may determine that NDI scanner 208 is not actually on the pre-defined path and reposition NDI scanner 208 accordingly.

Figure 8:
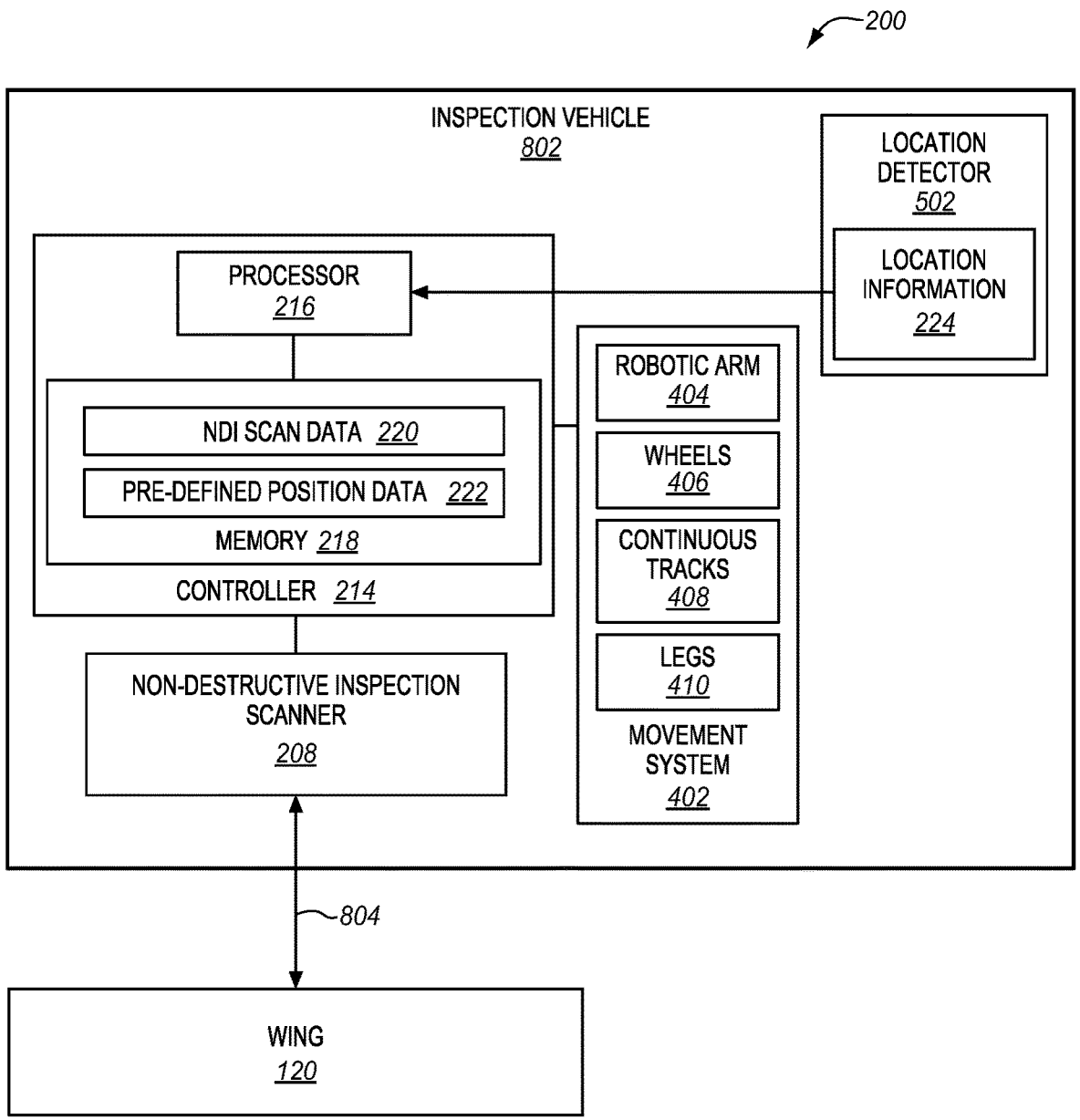
FIG. 8 is a block diagram of an inspection vehicle in an illustrative embodiment.

FIG. 8 is a block diagram of an inspection vehicle 802 in an illustrative embodiment. In this embodiment, inspection vehicle includes controller 214, NDI scanner 208, movement system 402, and location detector 502, all previously described.

FIG. 9 illustrates a top view of a portion of wing 120 of aircraft 100 in an illustrative embodiment. Also illustrated in FIG. 9 is a pre-defined path 902 across a surface 904 that inspection vehicle 802 is programmed to follow, with the starting location at a known location 906.

To begin inspection 804 of wing 120, inspection vehicle 802 is placed at known location 906 on surface 904 of wing 120. In this embodiment, location detector 502 measures a location of inspection vehicle 802 on surface 904 of wing 120 that is relative to known location 906. For instance, location detector 502 may be a displacement detector that updates location information 224 as movement system 402 moves inspection vehicle 802 relative to wing 120. As a displacement detector, location detector 502 may be implemented as a rotary encoder attached to one or more wheels 406 or continuous tracks 408 of movement system 402.

To begin inspection 804, processor 216 activates NDI scanner 208 and directs movement system 402 to move inspection vehicle 802 along pre-defined path 902. As inspection vehicle 802 moves along pre-defined path 902, NDI scan data 220 is generated. NDI scan data 220 is capable of revealing the various subsurface features of wing 120, including ribs 908-912 (e.g., subsurface parts). Processor 216 analyzes NDI scan data 220 to detect transitions which represent, for example, boundaries 914-923 of ribs 908-912 captured by NDI scan data 220. Of course, other subsurface features may be detected by analyzing NDI scan data 220, such as stringers, spars, brackets, fasteners, etc.

Processor 216 accesses pre-defined position data 222 for the boundaries 914-923 of ribs 908-912. For example, pre-defined position data 222 may spatially define boundaries 914-923 of ribs 908-912 in wing 120 and their locations relative to known location 906. As inspection vehicle 802 moves along pre-defined path 902, location detector 502 measures a displacement of inspection vehicle 802 relative to known location 906. This measurement is not perfect, and is subject to error. In particular, the error in measurement may compound as inspection vehicle 802 moves along pre-defined path 902. The compounding of this measurement error may result in inspection vehicle 802 moving off of pre-defined path 902, which is undesirable. For instance, if inspection vehicle 802 does not move along pre-defined path 902, then inspection 204 may need to be performed again.

Processor 216 correlates pre-defined position data 222 for boundaries 914-923 of ribs 908-912 with transitions in the NDI scan data 220 that represent boundaries 914-923, and uses information about known location 906 to correct the location measured by location detector 502. For example, pre-defined position data 222 may spatially define boundary 923 of rib 912 relative to known location 906. As processor 216 detects a transition in NDI scan data 220 that represents boundary 923, processor 216 can calculate the displacement of NDI scanner 208 along pre-defined path 902 relative to known location 906 using information from pre-defined position data 222. Processor 216 may then calculate a deviation between the displacement of NDI scanner 208 on wing 120 relative to known location 906, and the measured displacement of NDI scanner 208 on wing 120 relative to known location 906. This deviation is a measurement error that can be corrected by updating the displacement measured by location detector 502 with the corrected values.

In some embodiments, an action is performed when the deviation is greater than a threshold value. For instance, when the deviation is greater than a threshold value, then processor 216 may direct movement system 402 to re-position inspection vehicle 802 on wing 120. For instance, if the deviation is greater than a threshold value, the movement system 402 may be used to reposition inspection vehicle 802 back to a previous known point on wing 120 (e.g., known location 906).

In some embodiments, inspection vehicle 802 is programmed to follow pre-defined path 902 across wing 120, thereby collecting NDI scan data 220 during inspection 204, while concurrently re-calibrating location information 224 using boundaries 914-923 detected within NDI scan data 220 and pre-defined position data 222. This type of activity allows inspection vehicle 802 to rapidly and accurately perform inspection 204 of wing 120 with little or no oversight by an operator, thus expediting inspection 204.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. An inspection apparatus configured to perform an inspection of a structure, the inspection apparatus comprising:
    a Non-Destructive Inspection (NDI) scanner configured to generate NDI scan data while moving along a surface of the structure; and
    a controller comprising:
        a processor configured to receive location information measured for the NDI scanner while moving along the surface of the structure, and to correlate the location information measured for the NDI scanner with the NDI scan data; and
        a memory configured to store pre-defined position data regarding a subsurface feature of the structure;
    wherein the processor is further configured to analyze the NDI scan data to detect the subsurface feature within the structure, to access the pre-defined position data for the subsurface feature, and to correct the location information correlated with the NDI scan data based on the pre-defined position data for the subsurface feature.

2. The inspection apparatus of claim 1, wherein:
    the NDI scanner is configured to generate the NDI scan data during an anomaly detection process; and
    the processor is configured to correlate the NDI scan data with an anomaly detected in the structure, and to store a measured location of the anomaly based on the corrected location information.

3. The inspection apparatus of claim 1, wherein:
    the processor is further configured to perform an edge detection process on the NDI scan data to detect a boundary of the subsurface feature within the structure, wherein the pre-defined position data is for the boundary of the subsurface feature.

4. The inspection apparatus of claim 1, further comprising:
a location detector within the inspection apparatus configured to generate the location information.

5. The inspection apparatus of claim 4, wherein:
the location detector comprises one or more rotary encoders configured to measure a displacement of the inspection apparatus relative to the structure.

6. The inspection apparatus of claim 1, further comprising:
a movement system configured to move the NDI scanner on the surface of the structure.

7. The inspection apparatus of claim 6, wherein:
the movement system comprises a robotic arm.

8. The inspection apparatus of claim 6, wherein:
the movement system comprises wheels, continuous tracks, or legs, or combinations of the wheels, the continuous tracks, and the legs.

9. The inspection apparatus of claim 1, wherein:
the structure comprises an aircraft structure.

10. The inspection apparatus of claim 9, wherein:
the subsurface feature comprises a subsurface rib of a wing.

11. A method of performing an inspection of a structure with an inspection apparatus, the method comprising:
generating Non-Destructive Inspection (NDI) scan data while moving an NDI scanner along a surface of the structure;
receiving location information measured for the NDI scanner while moving along the surface of the structure;
correlating the location information measured for the NDI scanner with the NDI scan data;
storing pre-defined position data regarding a subsurface feature of the structure;
analyzing the NDI scan data to detect the subsurface feature within the structure;
accessing the pre-defined position data for the subsurface feature; and
correcting the location information correlated with the NDI scan data based on the pre-defined position data for the subsurface feature.

12. The method of claim 11, wherein:
generating the NDI scan data comprises generating the NDI scan data during an anomaly detection process; and
further comprising:
correlating the NDI scan data with an anomaly detected in the structure; and
storing a measured location of the anomaly based on the corrected location information.

13. The method of claim 11, wherein analyzing the NDI scan data to detect the subsurface feature comprises:
performing an edge detection process on the NDI scan data to detect a boundary of the subsurface feature within the structure, wherein the pre-defined position data is for the boundary of the subsurface feature.

14. The method of claim 11, further comprising:
generating the location information with a location detector within the inspection apparatus.

15. The method of claim 11, wherein:
the structure comprises an aircraft structure.

16. The method of claim 15, wherein:
the subsurface feature comprises a subsurface rib of a wing.

17. An inspection vehicle configured to perform an inspection of a structure, the inspection vehicle comprising:
a Non-Destructive Inspection (NDI) scanner configured to generate NDI scan data while moving along a surface of the structure;
a movement system configured to move the NDI scanner along the surface of the structure; and
a controller comprising:
a processor configured to receive location information measured for the NDI scanner while moving along the surface of the structure, and to correlate the location information measured for the NDI scanner with the NDI scan data; and
a memory configured to store pre-defined position data regarding a subsurface feature of the structure;
wherein the processor is further configured to analyze the NDI scan data to detect the subsurface feature within the structure, to access the pre-defined position data for the subsurface feature in the memory, and to correct the location information correlated with the NDI scan data based on the pre-defined position data for the subsurface feature.

18. The inspection vehicle of claim 17, wherein:
the NDI scanner is configured to generate the NDI scan data during an anomaly detection process; and
the processor is configured to correlate the NDI scan data with an anomaly detected in the structure, and to store a measured location of the anomaly based on the corrected location information.

19. The inspection vehicle of claim 17, further comprising:
a location detector within the inspection vehicle configured to generate the location information.

20. The inspection vehicle of claim 17, wherein:
the structure comprises an aircraft structure.

* * * * *